Nov. 5, 1929. B. C. STICKNEY Re. 17,478
TYPEWRITING MACHINE
Original Filed July 9, 1925 2 Sheets-Sheet 1
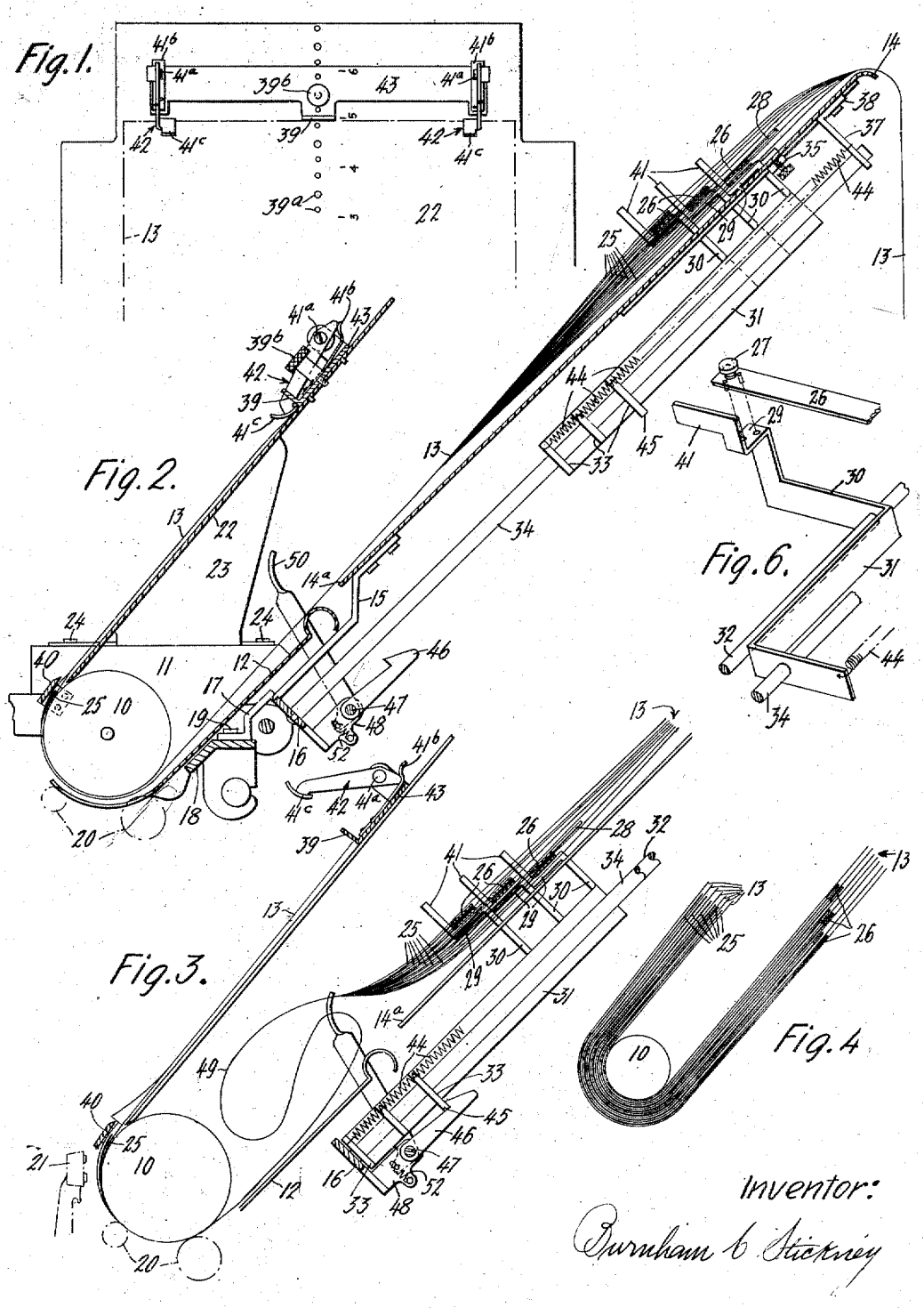
Inventor:
Burnham C. Stickney Nov. 5, 1929.

B. C. STICKNEY

TYPEWRITING MACHINE

Re. 17,478

2 Sheets-Sheet 2

Original Filed July 9, 1925

Inventor:

Burnham C. Stickney

Reissued Nov. 5, 1929 Re. 17,478

UNITED STATES PATENT OFFICE

BURNHAM C. STICKNEY, OF HILLSIDE, NEW JERSEY, ASSIGNOR TO UNDERWOOD ELLIOTT FISHER COMPANY, OF NEW YORK, N. Y., A CORPORATION OF DELAWARE

TYPEWRITING MACHINE

Original application filed July 9, 1925, Serial No. 42,382. Continuation of application filed June 17, 1925, Serial No. 37,609. Original No. 1,679,952, dated August 7, 1928. Application for reissue filed August 10, 1928, Serial No. 298,749.

This invention relates to typewriting machines in which webs, usually fan-folded, are typed. These webs are printed with a succession of forms, and it is customary to employ manifolding material in the form of sheets of carbon which are stripped or shifted from each typed form to a succeeding form preparatory to typing the latter. This application is a continuation of and substitute for my application, Serial No. 37,609, filed June 17, 1925.

An object of the invention is to provide a simple, inexpensive, light device for stripping the carbons, of such a character that the stripping device and the web-presenting devices can be attached directly to the typewriting machine, or to the carriage thereof, with little or no alteration therein, and may be simply, easily and rapidly manipulated.

Where many copies are being manifolded, a difficulty arises in round-platen typewriters, when it is necessary to strip the carbons from the typed form to the fresh form on the web, because a snubbing effect is produced, and the carbons stick to the plies of the web where they bend or loop around the platen. The carbons have the effect of one binding upon another as it is attempted to pull them all back around the under side of the platen. This has not successfully been accomplished. If it is attempted to attach the carbons at their rear ends to a carrier, the carbons will prove difficult or impossible to strip or shift, and they would become torn. To avoid this obstacle, it has been the practice to displace the platen upwardly to permit the composite web to be straightened out, and a carbon-carrier has been provided which strips the carbons easily back to their new positions; whereupon the platen has been depressed to typing position. Such a device is disclosed in the U. S. patent to Wernery & Smith, No. 1,132,055, dated March 16, 1915. This makes necessary a substantial and expensive reconstruction of the typewriter-carriage and the platen-connections and also to provide expensive and bulky supporting frames and appurtenances.

It is one of the features of this invention to provide means for successfully stripping the carbons, as they stand looped around the platen at the completion of the typing of a form, by merely pulling them back around the underside of the platen from the typed form to the succeeding form. To this end, each carbon is mounted upon an independently operable carrier. There are preferably as many carriers as there are carbons, and each carrier can move independently of all the others. It is within the scope of the invention, however, to attach two carbons to each independently movable carrier in some cases. After a form is typed, the outermost carbon may be stripped from the typed form and retracted to the next form, and therefore no longer binds upon the inner carbons. Said outer carbon strips easily and readily, because there is no carbon or sheet snubbing or binding thereon. Then the next outer carbon may be stripped from the typed form to the succeeding form, and it moves easily, because the outer carbon has been shifted back from around the platen. Then the third carbon may be shifted in like manner, and then the fourth, and so on; each carbon shifting readily because it is not bound by any other carbon.

It will thus be seen that the carbons may be stripped one after another, beginning with the free (outer) carbon, until they are all stripped.

This overcomes the difficulty heretofore experienced of the snubbing or binding of taut carbons upon one another as it was attempted to pull them around the platen. In the present invention there need be no binding and no difficulty.

If two adjacent carbons are attached to one carrier, they can in some cases be stripped successfully, because the binding of the outer upon the inner of the two carbons is not sufficient to prohibit the stripping operation.

There may be a table or shelf extended upwardly and rearwardly from the usual paper-shelf in rear of the typewriter platen, and the fan-fold web or loose web-plies may be led up over the top of this extension, and then downwardly over it to the intake side of the platen. Each carbon-carrier may comprise a blade or finger, which is thrust in between plies of web and carries a carbon, the fingers pointing alternately in opposite directions to accommodate the fan-folding of the web. Under the table may be ranged a set of tracks in the form of rods, fixed upon the platen carriage, preferably two rods for each group of carbon-carriers, so that if there are two groups, there are four rods. Slides may travel up and down on the rods, each slide having at its ends ears bored to fit upon the rod, so that it will slide easily. From each slide may extend to the right or left, as the case may be, an arm, said arm extending out beyond the side of the web-table and having at its outer end a head or mount upon which is fastened a carbon-carrying blade, which extends from said mount inwardly to the plies of the web. In case it is desired to carry two carbons on one carrier, the slide may have two arms, one extending to the left and one extending to the right, and oppositely-pointing blades being mounted thereon respectively.

It will be seen that at the completion of the typing operation, said slides or arms may be grasped by the operator one after another, and each one pushed upwardly along the paper-shelf-extension or web-table as far as it will go, thereby stripping its carbon from the typed form. Preferably, the outer carbon is stripped first, but this may not be necessary in all cases, because it is evident that in manual operation the inner carbon can be stripped first, inasmuch as the outer carbons, not being taut, are not binding upon the inner carbon and do not snub nor seriously hinder its movement. It will be understood that the usual feed-rolls are released which hold the composite web upon the bottom of the platen, so as to permit the stripping operation. It is practicable in this manner to strip one carbon and possibly two at each movement.

Said frame and rods or tracks, and the slides or carriers thereon, are all that it is necessary to add to an ordinary typewriting machine to convert it into a fan-fold or other web-typing machine; a detachable delivery shelf being also added to the platen-frame, with gage, web-clip, etc.

If desired, each carbon-carrying blade may be provided with a knife to split the fold of the web at the operation of stripping the carbon.

In the preferred form of the invention, each carrier may be provided with an individual spring for effecting its carbon-stripping movement. These springs may tend constantly to retract the carbons. The carbon-carriers may be latched in their advanced positions, and, upon being unlatched, their springs tend to pull all the carbons back around the platen, the outer carbons binding and tending to grip the inner carbons, so that the latter are not retracted first. The driving spring on the outer carbon-carrier is the first to complete the stripping of its carbon, because the same is not bound upon by other carbons. This makes the next carbon become the outer one, and, accordingly, its spring is effective next. Then the third carbon may be retracted by its spring, and so on, each carbon, upon being sufficiently released, being automatically retracted. If the carbons are provided with web-splitting knives, the driving springs may be made of corresponding strength. The springs may be made weaker and serve only to assist the manual retraction of the carbons.

After the typing of each form is completed, and prior to the stripping of the carbons, the composite web may be advanced and gaged at the proper point for eventually tearing off the typed form by means of a knife extending along the front upper side of the platen. The carbon-stripping occurs before the web is severed. The spring-retracted carbon-carriers may be arrested by stops, which stops preferably are adjusted to vary the length of the strokes of the carbon-carriers. Each carbon-carrier has preferably the same length of stroke as the others. Before beginning the typing of the next form, all of the carbon-carriers are preferably pulled downwardly and latched in their bottom positions, thus forming a loop of composite web between the carbon-carriers and the platen, which loop is taken up at the line-spacing operations as the next form is typed. This makes it unnecessary for the platen and its feed-rolls to pull the composite web against the tension of a multiplicity of carbon-carrier-retracting springs, the aggregate tension of which is strong, especially where the springs must also split the webs when retracting the carriers. The track-rods are parallel with one another and mounted by their ends upon the web-table frame which forms an attachment that is secured upon the platen-carriage of the typewriting machine.

Other features and advantages will hereinafter appear.

In the accompanying drawings,

Figure 1 is a front view of the delivery shelf with gage and clip.

Figure 2 is a sectional side elevation of the preferred form of the invention, showing the carbon-strippers as having been retracted by their springs and arrested by the adjustable stops.

Figure 3 shows the strippers as having been pressed down towards the platen, forming an idle loop of composite web the springs tensioned and the strippers latched.

Figure 5:
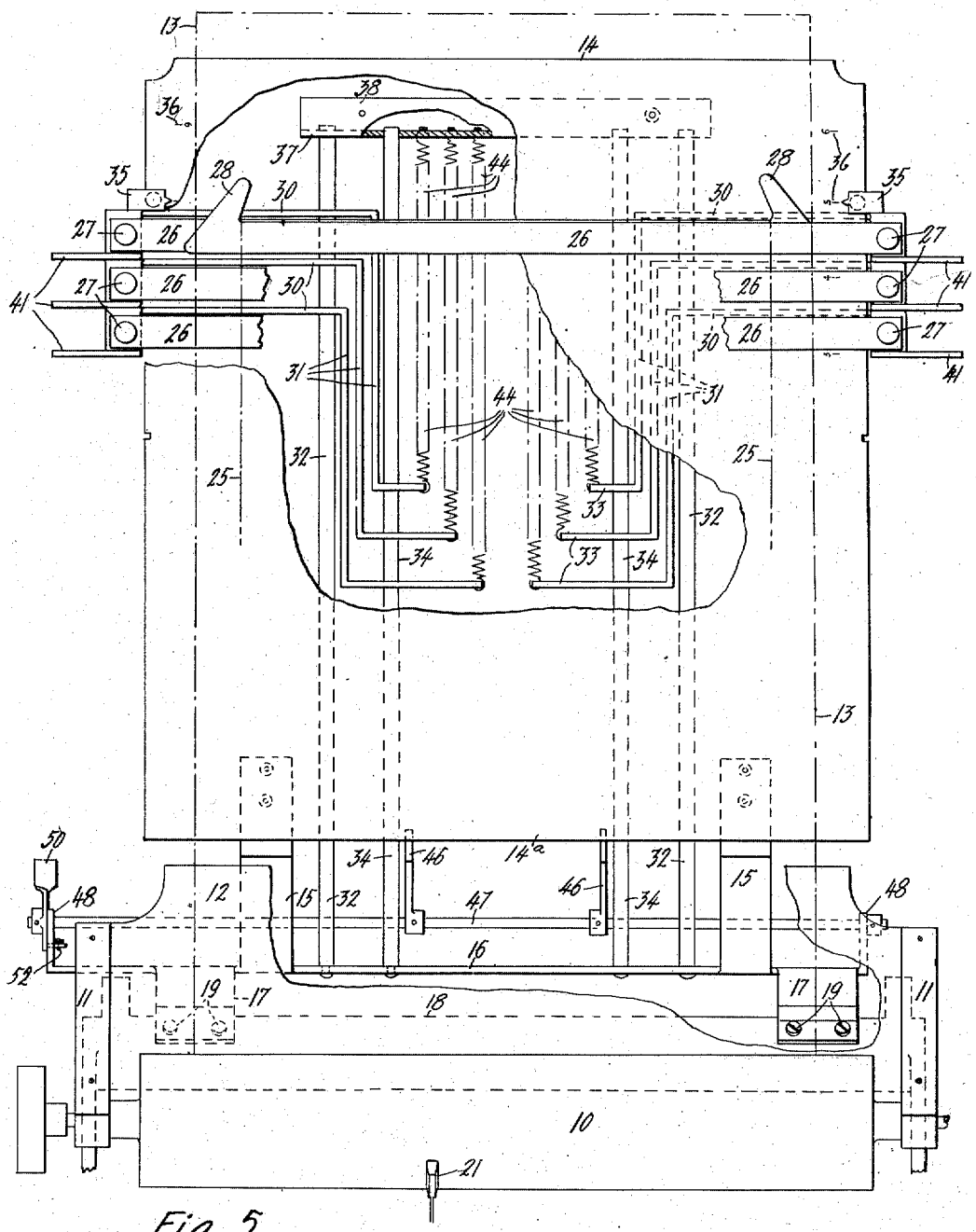

Figures 4 shows diagrammatically the carbon and work-web looped around the platen at the completion of the typing of a form, in which position the attempt to pull back the carbons has heretofore been unsuccessful, the inner carbons being bound by the outer ones and holding fast the whole set of carbons, which because of their weakness are liable to rupture if much force is exerted thereon. This figure also shows the positions of the individual strippers at this time.

Figure 5 is a view, looking downwardly and rearwardly, of the platen, web-table carbon-strippers, spring, latches, etc.

Figure 6 shows a stripper in perspective.

The revoluble platen 10 of a standard Underwood typewriting machine is mounted upon a platen-frame comprising ends 11 and a paper-shelf 12 extending upwardly and rearwardly at the rear of the platen 10. A fan-fold web 13 is led upwardly from a source of supply and then down over the rear or top edge 14 of a broad table, which extends upwardly and rearwardly from the usual paper-shelf 12. The lower or front end of said table is seen at 14[a], and it is supported by means of arms 15 extending rearwardly from a cross-bracket 16, the latter having at its ends forwardly-projecting ears 17, whereby it is detachably secured upon the typewriter-carriage bar 18 by screws 19, such as are usually employed upon said bar in said machine; the web-table 13 and its appurtenances being preferably in the nature of an attachment to the standard typewriting machine, making unnecessary any alteration in the machine.

The fan-folded web is led down along said table 14 and passes downwardly and forwardly between the platen and the paper-shelf 12, and is held and fed by the usual releasable feed-rolls 20, running upon the under side of the platen. The web is typed by means of the usual type-bars 21, and feeds upwardly and rearwardly along a delivery shelf 22 that extends upwardly and back from the platen; said delivery shelf having legs 23 whereby it is detachably supported by screws 24 usually employed upon the platen-frame ends 11; said delivery shelf being also in the nature of an attachment.

Carbon-sheets 25, interleaved between the plies of fan-fold web, are carried by blades 26, constructed as usual in the well-known Underwood fan-fold typewriting machine; and each blade may be detachably held at one end, by means of a screw 27, upon a suitable support, the blades extending across the fan-fold web and pointing alternately right and left to accommodate the fan-folding of the web. Preferably, each blade carries a splitter 28 of usual construction, to split the folds of the web at the carbon-stripping operation.

The carbon-carrying blades are fastened by said screws 27 upon individual heads 29, that are bent over upon arms 30, the latter extending to the right and left from slides or carriers 31. These slides are individual to the carbon-blades. Each slide arm 30 is perforated to fit and slide upon a fixed rod 32, and each slide has at its lower end an ear 33 bent oppositely from 30, to fit and slide upon a companion inner fixed rod or track 34. The parts are shown at Figures 2 and 5 in their rearmost positions, resting against adjustable stops 35. The stops are adjustable along the opposite edges of the web-table 14, which is provided with scales 36 for convenience in adjusting said stops, thus permitting the use of webs having different lengths of printed forms. It will be seen that the carbon-blades 26 are compact in their rearmost positions at Figures 2 and 5, this compactness being permitted by the nesting of the slides 31, which are preferably divided into two groups, one group nested on the right-hand rods 32, 34, and the other group nested on the left-hand rods 32, 34. The rods or tracks are riveted at their forward ends to the cross-bar 16 of the main bracket, and extend upwardly and rearwardly under the carbon-blades, and preferably under the web-table, and are supported at their rear ends in a flange 37 provided upon a plate 38, which is fixed to the rear or under side of the web-table 14 at its upper end; said rods 32 being stationary, to guide the carbon slides or strippers.

The invention is not limited to a slide having a single carbon-carrier thereon, inasmuch as the arms 30 of any slide or slides may, if desired, be extended entirely across the work-web table, and may carry at their opposite ends carbon-blades 26, whereby two carbons may be controlled by each slide or stripper within the scope of the invention.

The inserting or loading of the carbons into the fan-fold web may be done before the web is inserted around the platen, and while the carbon-slides are in their rearmost positions; the web extending forwardly and resting temporarily upon the top of the platen or elsewhere. After the carbons are loaded into the web, in a manner known in this art, the leading end of the composite web may be thrust down between the paper-shelf 12 and the platen; the feed-rolls being at this time cast off.

The web may be advanced between the rolls and platen, and brought up to position in front of the platen to receive the first line of typing. Then the feed-rolls may be restored, and the typing may proceed line by line until the form is finished, whereupon the leading edge of the web may be brought up against a gage 39 that is provided upon the delivery shelf 22, at which time the web is in position to be eventually torn off by a transverse knife 40 which is mounted upon the platen-frame in front of the platen, the web having been delivered between the knife and the platen onto the delivery shelf 22. Gage 39 is adjustable up and down the shelf 22, threaded apertures 39[a] being formed therein at spaced intervals for receiving a set screw 39[b] for holding it in position, which position is determined according to the length of the form on the web. Before tearing off the web, however, the carbon-carriers should be retracted to the rearmost position seen at Figures 2 and 5, together with the carbons. These carbon-carriers or strippers may be retracted one after another, by the use of finger-pieces 41 provided thereon, as illustrated for all six of the carbon-strippers at Figure 5. Preferably the upper outermost carbon is stripped or retracted first, and then the next inner carbon, and so on, although this order is not important in all cases, especially where no springs are used.

During the retraction or stripping of the carbons, which may take place before the web-severing operation, the web is preferably held by clips 42, which are mounted on pivots 41[a] and provided with springs 41[b], which operate their ends 41[c], so as to pinch the sides of the web at its leading end against the delivery shelf 22, so that the web remains gaged until the carbon-stripping is finished; whereupon the web may be torn off against the knife 40. These web-detaining clips 42 are preferably mounted upon a plate 43, which carries the leading-edge gage, so that the clips may be adjusted with the gage, and be useful for clipping the web at the carbon-stripping operation in any position to which the gage may be adjusted.

During the stripping of the web, that is, during the backward movement of the blades 26 along the web-table 14, the splitters 28 may be utilized to split the folds of the web, these splitters being individual to the slides 31, and the splitting operation being therefor rendered automatic and easy.

In the preferred form of the invention, the strippers are power-driven, or at least aided in their stripping action, as by means of draw-springs 44, attached at their forward ends to the ears 33, and connected at their rear ends to the flange 37. In order to put the springs under tension, the uppermost finger-pieces 41 may be grasped and pulled downwardly along the web-table, thus bringing down all the slides with their carbon-blades, until lugs 45 on the innermost or topmost slides 31 are caught by latches 46, whereby all of the slides are held in lowermost positions against the tension of the returning springs 44. Said latches 46 may be carried upon a rock-shaft 47, pivoted at its ends in arms 48 bent back from the transverse bracket or bar 16. During this forward or downward movement of the stripping slides, the composite web is carried along by the blades 26, between which it is threaded; and an idle loop or slack 49 is formed at the bottom of the web-table, between the set of carbon-carriers and the platen, and below the delivery shelf. During the subsequent line-spacing operations of the platen, this loop is gradually taken up; the strippers remaining stationary at the line-spacing operations.

At the completion of the typing of any form, the platen is revolved to take up the remainder, if any, of the loop 49, and to bring the leading end of the web up against the gage 39. Then the clips 42 are thrust down to hold the web stationary against the web-table, and a finger-piece 50 upon the rock-shaft 47 is depressed to release the latches 46 and permit the individual springs 44 to strip the carbons. These springs put tension upon all the carbons, which at this time extends between the web-plies down around the under side of the platen and up in front thereof and up along the delivery shelf (Figure 4); and by reason of the pull of the springs 44 the outer carbons tend to snub or bind the inner carbons around the platen and to interfere with or prevent the movement of the inner carbons; but the outermost carbon has nothing binding upon it, nor interfering with its free movement, so that it is carried back by its spring against stop 35. This outer carbon is connected to the carrier or stripper 31 which is most remote from the platen, and, as shown, this is the right-hand stripper, whose blade 26 overlies the blade of the rearmost right-hand stripper. This rearmost right-hand stripper is arrested by a stop 35. This relieves all tension upon said carbon, and hence all binding upon the next inner carbon, which is thus free to be carried back by its spring against the left-hand stop 35, which arrests the rearmost carbon-carrier at the left-hand side. This in turn relieves all binding upon the next inner carbon, and so on, until all the carbons are freed and restored. The innermost carbons at Figures 2 and 3 are connected to the stripper bars 26 that are nearest the platen and that are the last ones to be retracted. Then the clips are released, and the typed form is severed from the web by means of the knife 40. At this time the fresh form, and also the leading ends of the carbons, are in position for beginning the first line of typing on the next form; but before typing said line, the topmost finger-pieces 41 may be grasped and pulled downwardly, thus carrying down both of the topmost or most remote slides or strippers, and with them the remainder of the set of slides, all of the slides being caught and retained by the single pair of automatic latches 46, which are held in latching positions by a spring 52, the latches yielding as the strippers are brought down. The springs may be made, if desired, too weak to strip the carbons, but capable of assisting the manual retraction of the carbon-strippers one after another.

The invention is not limited to carbon-stripping slides placed under the web-table, nor to carbon-strippers which are in the form of slides, nor is the web-table necessary in all instances. It is not necessary to use latches when no springs are used; and the outermost carbons may be connected to the carriers that are nearest the platen, as at Figure 4. Preferably, however, they are connected to the most remote carriers, as at Figures 2 and 3.

It will be seen that the stripping movement between the work-plies and carbon is effected by the movement of truck 30, 31; and in order that the stripping may be effected by moving this truck or carrier, there is provided a co-operative clip 42, whereby the work-plies are releasably clipped at the leading end of the web. The movement of the stripper-truck pulls the material around the platen while the webs are clipped, and the adjustable stop 35 terminates the stripping movement of the truck away from the platen. The stripping is effected while the plies of the work-web extend around the platen.

Variations may be resorted to within the scope of the invention, and portions of the improvements may be used without others.

Having thus described my invention, I claim:

1. A multiple-ply web-manifolding typewriting machine, including, in combination, a platen, types and a multiplicity of strippers individual to superposed carbons, said strippers movable seriatim to strip the carbons one by one, between the work-sheets and relatively thereto.

2. In a multiple-ply web-manifolding typewriting machine, the combination with a platen and types, the platen being permanently in typing position, of a multiplicity of indepently movable strippers individual to superposed carbons and ranged at the intake side of the platen, and guideways to guide said strippers towards and away from the platen between the plies of work-web.

3. In a multiple-ply web-manifolding typewriting machine, the combination with a platen and types, of a platen frame, a web-table on said frame and extending rearwardly from the intake side of the platen, tracks under said table, and carbon-strippers movable independently of one another along said tracks towards and away from the platen between the plies of work-web.

4. In a multiple-ply web-manifolding typewriting machine, the combination with a platen and types, of a web-table extending rearwardly from the intake side of the platen, tracks under said table, and carbon-strippers movable independently of one another between the plies of work-web and along said tracks towards and away from the platen, each carbon-stripper including a slide and a carbon-blade, the slides traveling on said tracks.

5. In a web-manifolding typewriting machine, the combination with a platen and types, of a web-table extending rearwardly from the intake side of the platen, tracks under said table, and carbon-strippers movable independently of one another along said tracks towards and away from the platen, each carbon-stripper including a slide and a carbon-blade, the slides traveling on said tracks, each slide extending along the track and having a cross-arm projecting beyond the side of the table, and carbon-blades secured to the projecting ends of the cross-arm.

6. In a multiple-ply web-manifolding typewriting machine, the combination with a platen and types, of guideways extending rearwardly at the intake side of the platen beneath the work-web, and a multiplicity of carbon-carriers, one for each carbon, mounted for movement independently of one another along said guideways between the plies of work-web.

7. In a multiple-ply web-manifolding typewriting machine, the combination with a revoluble platen and types, of a roll to feed the work around the platen, and mechanism controllable independently of said roll for retracting one after another a multiplicity of carbons interleaved with a multiplicity of plies of work-web extending around the platen.

8. In a multiple-ply web-manifolding typewriting machine, the combination with a revoluble platen and types, of mechanism for retracting one after another a multiplicity of carbons interleaved with plies of work-web extending around the platen, including a multiplicity of carriers and means for connecting them individually to the carbons, said carriers being movable independently of one another between the work-plies to strip the carbons individually.

9. The combination with a typewriting machine having types, a platen, a platen-carriage, and feed-rolls releasable from the platen, of a multiple-ply web-manifolding attachment secured upon said carriage and having means independently of said feed-rolls for stripping the carbons independently of one another from the plies of the released work-web as they extend around the platen.

10. A multiple-ply web-manifolding attachment for a revoluble platen typewriting machine having a platen-frame, including a supporting frame attachable to said platen-frame, said supporting frame having guides extending tangentially away from the platen, and strippers individual to the carbons and bodily movable independently of one another along said guides between the work-plies.

11. In a web-manifolding typewriting machine, the combination with a platen and types, of a web-table extending rearwardly from the intake side of the platen, tracks under said table, and carbon-strippers movable independently of one another along said tracks towards and away from the platen, said tracks in the form of rods, and each slide extending along a rod and having a carbon-blade-carrying arm fitting to said rod, and also having an ear directed oppositely from said arm and an adjacent rod.

12. The combination with a typewriter-platen, of a set of rods directed tangentially away from the platen, and indivdual carbon-strippers upon said rods and movable therealong independently of one another between the plies of work-web.

13. The combination with a typewriter-platen, of a set of rods directed away from the platen, and individual carbon-strippers upon said rods and movable therealong independently of one another; the strippers having carbon-holding blades and also including slides having arms fitting upon one of the rods and carrying said blades, and also having ears fitting upon an adjacent rod; said slides having a nested arrangement.

14. The combination with a typewriter-platen, of a set of rods directed away from the platen, and individual carbon-strippers upon said rods and movable therealong independently of one another; said strippers including slides mounted upon said rods, said slides having oppositely directed carbon-blade-carrying arms.

15. The combination with a typewriter-platen, of a set of rods directed away from the platen, and individual carbon-strippers upon said rods and movable therealong independently of one another; said strippers including slides mounted upon said rods, said slides having oppositely directed carbon-blade-carrying arms, said slides capable of nesting at the completion of their travel in either direction.

16. A multiple-ply web-manifolding typewriting machine, including, in combination, a platen, types, a multiplicity of independently movable strippers individual to the carbons, and mounted for movement between the plies of work-web, and driving springs for said strippers.

17. In a web-manifolding typewriting machine, the combination with a platen and types, of a multiplicity of independently movable strippers individual to the carbons, driving springs for said strippers, and means for latching said strippers.

18. In a web-manifolding typewriting machine, the combination with a platen and types, of a multiplicity of independently movable strippers individual to the carbons, and a stop common to said strippers for arresting them at the completion of the stripping operation.

19. In a web-manifolding typewriting machine, the combination with a platen and types, of a multiplicity of independently movable strippers individual to the carbons, and adjustable means for determining the extent of the stripping movement.

20. In a web-manifolding typewriting machine, the combination with a platen and types, of a multiplicity of independently movable strippers individual to the carbons, driving springs for said strippers, means for latching said strippers, and means for arresting said strippers.

21. In a typewriting machine having a revoluble platen, a web-manifolding means including a multiplicity of carbon-strippers movable towards the platen to form a loop of composite web at the intake side of the platen, and releasable means for holding the strippers stationary at the line-feeding operation of the platen taking up the loop.

22. In a typewriting machine having a revoluble platen, a web-manifolding means including a multiplicity of carbon-strippers movable towards the platen to form a loop of composite web at the intake side of the platen, releasable means for holding the strippers stationary at the line-feeding operation of the platen taking up the loop, releasable feeding means pressing the composite web against the platen, and means individual to each stripper for retracting the same.

23. In a typewriting machine having a revoluble platen, a web-manifolding means including a multiplicity of carbon-strippers movable towards the platen to form a loop of composite web at the intake side of the platen, releasable means for holding the strippers stationary at the line-feeding operation of the platen taking up the loop, and individual springs for retracting the strippers.

24. In a typewriting machine having a revoluble platen, a multiple-ply web-manifolding means including a multiplicity of carbon-strippers movable towards the platen to form a loop of composite web at the intake side of the platen, releasable means for holding the strippers stationary at the line-feeding operation of the platen taking up the loop, individual springs for retracting the strippers seriatim, and means arresting the retracted strippers.

25. In a web-manifolding typewriting machine, the combination with a platen and types, of a web-table extending rearwardly from the intake side of the platen, tracks under said table, carbon-strippers movable independently of one another along said tracks towards and away from the platen, said tracks in the form of rods, and each stripper extending along a rod and having a carbon-blade-carrying arm, and stripper-operating springs upon said rods.

26. In a typewriting machine having a revoluble platen, a web-manifolding means including a multiplicity of carbon-strippers movable towards the platen to form a loop of composite web at the intake side of the platen, means for retracting the strippers from the platen, a loop-former for manually pressing said strippers towards the platen, and means maintaining the strippers in loop-forming position against actuation by said retracting means.

27. In a typewriting machine having a revoluble platen, a web-manifolding means including a multiplicity of carbon-strippers movable towards the platen to form a loop of composite web at the intake side of the platen, spring means to drive said strippers individually away from the platen to effect the carbon-stripping, a loop-former for manually pressing said strippers towards the platen, and means latching the strippers in loop-forming position.

28. The combination of a revoluble platen, releasable feed-rolls running thereon, a series of springs, a series of carbon-stripping devices operable independently of one another between the plies of a multiple-ply web by means of said springs, and means to prevent the springs from retracting the composite web while it is held against the platen by the feed-rolls.

29. In a typewriting machine, the combination with a revoluble platen, of means for guiding down around under the platen and up in front thereof a multiplicity of plies of work-web interleaved with carbons, whereby the outer carbons, if tautened, bind upon the inner carbons, releasable feeding means for holding the composite web to the platen, and means for stripping the carbons from the plies of web independently of one another as they extend around the platen, beginning with the outermost.

30. In a typewriting machine, the combination with a revoluble platen, of means for guiding down around under the platen and up in front thereof a multiplicity of superposed plies of work-web interleaved with carbons, whereby the outer carbons, if tautened, bind upon the inner carbons, releasable feeding means for holding the composite web to the platen, and means for stripping the carbons from the plies of web independently of one another as they extend around the platen, said stripping means including a spring device, and the inner carbons being freed from the binding of the outer carbons by reason of the previous stripping movements of the latter.

31. In a web-manifolding typewriting machine, the combination with a platen and types, of a multiplicity of independently movable strippers individual to the carbons and including carbon-blades, said carbon-blades being provided with web-splitters, and means for operating said strippers individually seriatim to strip the carbons one by one and on the same movements to split the webs.

32. In a web-manifolding typewriting machine, the combination with a platen and types, of a multiplicity of independent strippers individual to the carbons and including carbon-blades movable seriatim to strip the carbons one by one, said carbon-blades being provided with web-splitters, and springs for operating said strippers and splitting the folds of the work-web.

33. The combination with a typewriting machine having types, a platen, a platen-carriage, and feed-rolls releasable from the platen, of a multiple-ply web-manifolding attachment secured upon said carriage and having means for stripping the interposed carbons independently of one another from the released work-web, a gage for the leading edge of the work-web, and a clamp for detaining the web.

34. In a typewriting machine having a revoluble platen, a multiple-ply web-manifolding means including a multiplicity of carbon-strippers movable towards the platen to form a loop of composite web at the intake side of the platen, releasable means for holding the strippers stationary between the web-plies at the line-feeding operation of the platen taking up the loop, a leading end web-gage, a web-severing knife associated therewith; said strippers being movable to strip the carbons seriatim between the knife and the platen, and means limiting the stripping movement of the strippers.

35. In a typewriting machine having a revoluble platen, a web-manifolding means including a multiplicity of carbon-strippers movable towards the platen to form a loop of composite web at the intake side of the platen, releasable means for holding the strippers stationary at the line-feeding operation of the platen taking up the loop, and individual springs for retracting the strippers, said strippers provided with web-splitters.

36. In a typewriting machine having a revoluble platen, a web-manifolding means including a multiplicity of carbon-strippers movable towards the platen to form a loop of composite web at the intake side of the platen, releasable means for holding the strippers stationary at the line-feeding operation of the platen taking up the loop, individual springs for retracting the strippers, said strippers provided with web-splitters, a clamp for the web, a leading-edge gage, means for arresting the strippers, and a web-severing knife.

37. The combination with a platen permanently in typing position, of individually retractable carbon-strippers avoiding snubbing of the carbons, said strippers being retracted one after another solely by hand.

38. In a multiple-ply web-manifolding machine, the combination with types and a platen around which pass superposed work-webs interleaved with carbons, of a set of devices for stripping the carbons individually, beginning with the outermost carbon.

39. In a multiple-ply web-manifolding machine, the combination with types and a revoluble platen permanently in typing position around which pass superposed work-webs interleaved with carbons, of releasable means for pressing the work-webs and carbons against the platen, and manually controllable means for stripping the carbons seriatim.

40. In a multiple-ply web-manifolding machine, the combination with types and a revoluble platen permanently in typing position around which pass superposed work-webs interleaved with carbons, of releasable means for pressing the work-webs and carbons against the platen, and manually controllable means for stripping the carbons seriatim, including a set of carriers individual to the carbons, each carrier having a finger-piece for controlling the same independently of the other carriers.

41. In a multiple-ply web-manifolding typewriting machine, the combination with a platen permanently in typing position and types, of strippers individual to superposed carbons, said strippers being mounted for bodily stripping movement independently of one another between the plies of work-web.

42. In a multiple-ply web-manifolding typewriting machine, the combination with a platen and types, of a multiplicity of strippers individual to superposed carbons interleaved with a multiplicity of plies of work-web and extended around the platen therewith, said strippers movable seriatim to strip the carbons one by one.

43. In a multiple-ply web-manifolding typewriting machine, the combination with a platen and types, of a multiplicity of strippers individual to superposed carbons interleaved with a multiplicity of plies of work-web and extended around the platen therewith, said strippers movable seriatim to strip the carbons one by one beginning with the carbon outermost from the platen.

44. In a multiple-ply web-manifolding typewriting machine, the combination with a platen and type, of guide-ways at the intake side of the platen extending rearwardly and tangentially from the platen, and a multiplicity of strippers individual to carbons and movable independently of one another along said guide-ways.

45. In a web-manifolding typewriting machine, the combination with a platen and types, of tracks extending rearwardly from the intake side of the platen, and a set of carbon-strippers individual to the carbons and movable independently of one another along said tracks towards and away from the platen.

46. In a web-manifoldinig typewriting machine, the combination with a platen and types, of tracks extending rearwardly from the intake side of the platen, and a set of carbon-strippers individual to the carbons and movable independently of one another along said tracks towards and away from the platen, each carbon-stripper including a slide and a carbon-blade.

47. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers, during the typing of a form on the web, and means for retracting the strippers individually, beginning with the stripper for the outermost carbon and ending with the stripper for the innermost carbon.

48. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers, during the typing of a form on the web, means for retracting the strippers individually, beginning with the stripper for the outermost carbon and ending with the stripper for the innermost carbon, and means for mechanically detaining the web during the stripping operation.

49. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers, during the typing of a form on the web, means for retracting the strippers individually, and a gage for the leading edge of the web at the delivery side of the platen, said gage locating the succeeding form in position to receive the first line of typing.

50. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers, during the typing of a form on the web, means for retracting the strippers individually, a gage for the leading edge of the web at the delivery side of the platen, said gage locating the succeeding form in position to receive the first line of typing, and a knife to sever the typed form when brought to said gage.

51. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers during the typing of a form on the web, and means for retracting the strippers individually, beginning with the stripper for the outermost carbon and ending with the stripper for the innermost carbon, each of said strippers having an individual finger-piece for operating the same.

52. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers, during the typing of a form on the web, and means for retracting the strippers individually, beginning with the stripper for the outermost carbon and ending with the stripper for the innermost carbon, each of said strippers having an individual finger-piece for operating the same, said finger-pieces being alternately right and left on the successive strippers.

53. In a web-manifolding typewriting machine, the combination with a platen over which the web is fed, of a set of carbon-strippers individual to the carbons at the intake side of the platen and movable independently of one another, said strippers arranged one behind another, the forward stripper connected to the inner carbon, and the rearmost stripper connected to the outermost carbon.

54. In a web-manifolding typewriting machine, the combination with a platen over which the web is fed, of a set of carbon-strippers individual to the carbons at the intake side of the platen and movable independently of one another, said strippers arranged one behind another, the forward stripper connected to the inner carbon, and the rearmost stripper connected to the outermost carbon, and a stop for the rearmost stripper.

55. In a web-manifolding typewriting machine, the combination with a platen over which the web is fed, of a set of carbon-strippers individual to the carbons at the intake side of the platen and movable independently of one another, said strippers arranged one behind another, the forward stripper connected to the inner carbon, and the rearmost stripper connected to the outermost carbon, a stop for the rearmost stripper, and finger-pieces upon said carbon-strippers, said stop effective to arrest all of said strippers.

56. In a web-manifolding typewriting machine, the combination with a platen over which the web is fed, of a set of carbon-strippers individual to the carbons at the intake side of the platen and movable independently of one another, and retracting springs connected to certain of said strippers.

57. In a web-manifolding typewriting machine, the combination with a platen over which the web is fed, of a set of carbon-strippers individual to the carbons at the intake side of the platen and movable independently of one another, and retracting springs connected to certain of said strippers, said springs aiding the manual retraction of said strippers.

58. In a front strike typewriting machine, the combination with a platen and a platen-frame, of means for effecting at any stage relative stripping movement between a carbon and work plies, while the work plies extend around the platen, including a stripping-track frame upon said platen-frame, said track frame extending upwardly and rearwardly away from the platen, and a stripper-truck mounted upon said track frame for upward stripping movement thereon and having means co-operative with said track frame to maintain said truck in parallelism with the platen, and a releasable latch to restrain said truck against movement in one direction.

59. The combination with a front strike typewriter platen, of means for effecting at any stage relative stripping movement between a carbon and work plies, while the work plies extend around the platen, including stripping tracks directed upwardly and rearwardly, a stripper-truck mounted upon said tracks and movable upward therealong to effect the stripping, a sheet-holder upon said truck, means for latching said truck, and a handle upon an end of said truck.

60. In a front-strike manifolding typewriter, the combination with a platen, of means for effecting at any stage a stripping movement between work-plies and carbon by pulling sheets around the platen and up therefrom while the latter is stationary in printing position, said stripping means including a clip whereby the work-plies are releasably clipped as a unit at the leading end of the web, and also including a stripper-truck whose movement pulls said material around the platen, and also including means extending upwardly and rearwardly from the platen for guiding said truck in parallelism with the platen.

61. In a front-strike manifolding typewriter, the combination with a platen, of means for effecting at any stage a stripping movement between work-plies and carbon by pulling sheets around the platen and up therefrom while the latter is stationary in printing position, said stripping means including a clip whereby the work-plies are releasably clipped at the leading end of the web, and also including a stripper-truck whose movement pulls said material around the platen, and also including means extending upwardly and rearwardly from the platen for guiding said truck in parallelism with the platen, and an adjustable stop to terminate the stripping movement of said truck up from the platen.

BURNHAM C. STICKNEY.